(12) United States Patent
Finch et al.

(10) Patent No.: US 9,244,445 B2
(45) Date of Patent: Jan. 26, 2016

(54) TEMPERATURE CONTROL BASED ON ENERGY PRICE

(75) Inventors: Michael F. Finch, Louisville, KY (US);
Shelly E. Warms, Louisville, KY (US);
Matthew Paul Schuhmann, Louisville, KY (US)

(73) Assignee: General Electric Company, Schenectady, NY (US)

(*) Notice: Subject to any disclaimer, the term of this patent is extended or adjusted under 35 U.S.C. 154(b) by 935 days.

(21) Appl. No.: 13/353,704

(22) Filed: Jan. 19, 2012

(65) Prior Publication Data

US 2012/0123594 A1 May 17, 2012

Related U.S. Application Data

(63) Continuation-in-part of application No. 12/644,556, filed on Dec. 22, 2009, now Pat. No. 8,280,556.

(51) Int. Cl.
*G05B 15/02* (2006.01)
*F24F 11/00* (2006.01)

(52) U.S. Cl.
CPC ......... *G05B 15/02* (2013.01); *F24F 2011/0064* (2013.01); *F24F 2011/0075* (2013.01); *G05B 2219/2642* (2013.01)

(58) Field of Classification Search
CPC . G05D 23/1951; G05D 23/32; F24F 11/0012; F24F 11/0086; F24F 2011/0067; F24F 2011/0068; F24F 2011/0071; F24F 2011/0073; F24F 2011/0075; H04L 12/2825; H04L 12/40013; H04L 2012/285; G05B 15/02; G05B 2219/2642; G06Q 50/06
USPC ............... 700/275, 276, 278, 286, 295, 296; 702/27, 130; 705/412; 165/200, 201, 165/238, 239, 267, 268; 236/1 R, 1 C, 46 R, 236/46 F, 47, 51, 90, 91 R, 91 D
See application file for complete search history.

(56) References Cited

U.S. PATENT DOCUMENTS

| | | | |
|---|---|---|---|
| 5,598,349 A | 1/1997 | Elliason et al. |
| 5,684,463 A | 11/1997 | Diercks et al. |
| 5,826,650 A | 10/1998 | Keller et al. |
| 5,924,486 A | 7/1999 | Ehlers et al. |
| 6,064,310 A | 5/2000 | Busak et al. |
| 6,167,389 A | 12/2000 | Davis et al. |
| 6,216,956 B1 | 4/2001 | Ehlers et al. |
| 6,574,581 B1 | 6/2003 | Bohrer et al. |
| 6,622,925 B2 | 9/2003 | Carner et al. |

(Continued)

FOREIGN PATENT DOCUMENTS

| | | |
|---|---|---|
| JP | 2000-18687 A | 1/2000 |
| JP | 2003-106603 A | 4/2003 |
| JP | 2009-20824 A | 1/2009 |

*Primary Examiner* — Crystal J Barnes-Bullock
(74) *Attorney, Agent, or Firm* — Dority & Manning, P.A.

(57) ABSTRACT

A system is disclosed comprising memory configured to store a temperature value based on a cost of a given energy resource, wherein the cost-based temperature value differs from a temperature value based on a temperature schedule. The system also comprises a controller operatively coupled to the memory and configured to compare the cost-based temperature value to the schedule-based temperature value, and to direct one of a cooling system and a heating system to maintain a temperature of an environment at the one of the cost-based temperature value and the schedule-based temperature value that results in an energy cost savings.

17 Claims, 13 Drawing Sheets

(56) References Cited

U.S. PATENT DOCUMENTS

| | | |
|---|---|---|
| 6,785,630 B2 * | 8/2004 | Kolk et al. .................... 702/130 |
| 6,860,431 B2 | 3/2005 | Jayadev et al. |
| 6,936,798 B2 | 8/2005 | Moreno |
| 7,010,363 B2 | 3/2006 | Donnelly et al. |
| 7,079,967 B2 | 7/2006 | Rossi et al. |
| 7,204,093 B2 | 4/2007 | Kwon et al. |
| 7,296,426 B2 | 11/2007 | Butler et al. |
| 7,331,187 B2 | 2/2008 | Kates |
| 7,364,093 B2 * | 4/2008 | Garozzo .................... 236/46 R |
| 7,392,661 B2 | 7/2008 | Alles |
| 7,752,856 B2 | 7/2010 | Senba et al. |
| 7,949,615 B2 | 5/2011 | Ehlers et al. |
| 8,008,603 B2 | 8/2011 | MacKenzie |
| 8,204,628 B2 * | 6/2012 | Schnell et al. ................ 700/278 |
| 8,528,831 B2 * | 9/2013 | Lin et al. ......................... 236/94 |
| 2006/0065750 A1 * | 3/2006 | Fairless ........................ 236/46 R |
| 2008/0315000 A1 | 12/2008 | Gorthala et al. |
| 2010/0070091 A1 | 3/2010 | Watson et al. |
| 2010/0082161 A1 | 4/2010 | Patch |
| 2011/0153090 A1 | 6/2011 | Besore et al. |
| 2012/0016524 A1 * | 1/2012 | Spicer et al. .................. 700/276 |
| 2012/0286051 A1 * | 11/2012 | Lyle ............................... 236/47 |
| 2012/0324931 A1 * | 12/2012 | Alden et al. .................... 62/157 |
| 2013/0099011 A1 * | 4/2013 | Matsuoka et al. ................ 236/1 |
| 2013/0274928 A1 * | 10/2013 | Matsuoka et al. .............. 700/276 |
| 2014/0166232 A1 * | 6/2014 | Al-Hallaj et al. ............ 165/11.1 |

* cited by examiner

Time-of-Use Pricing

Enter your desired temperature set-points for each rate level. 1006 1008 1010

| Rate Level | Cool Set-points Schedule | Heat Set-points Schedule | Opt-Out |
|---|---|---|---|
| Low | | | |
| Medium | [-] 80° [+] | [-] 66° [+] | ☐ |
| High | [-] 81° [+] | [-] 65° [+] | ☐ |
| Critical | [-] 82° [+] | [-] 64° [+] | ☐ |

Opt out of all price levels and Demand Response: ☐

Your thermostat can adjust your scheduled temperature based on your utility rate. Temperature adjustments occur only if energy savings can be gained.

Opt-out of a rate level to run your scheduled temperature at that utility rate.

1002

Cancel 1012    Done 1014

FIG. 10

TEMPERATURE CONTROL BASED ON ENERGY PRICE

CROSS-REFERENCE TO RELATED APPLICATION

The present application is a continuation-in-part of the U.S. patent application, entitled "Energy Management of HVAC System," filed on Dec. 22, 2009 under Ser. No. 12/644,556, now U.S. Pat. No. 8,280,556 the disclosure of which is incorporated by reference in its entirety herein.

BACKGROUND OF THE INVENTION

The subject matter disclosed herein relates to energy management, and more particularly to energy management effectuated by controlling temperature levels associated with a heating, ventilation and air conditioning (HVAC) system based on energy prices.

Many utilities are currently experiencing a shortage of electric generating capacity due to increasing consumer demand for electricity. Traditionally, utilities generally charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened. In order to reduce high peak power demand, many utilities have instituted time of use metering and rates which include higher rates for energy usage during on-peak times and lower rates for energy usage during off-peak times. As a result, consumers are provided with an incentive to use electricity at off-peak times rather than on-peak times.

Traditionally, to take advantage of the lower cost of electricity during off-peak times, a consumer typically manually operates an HVAC system during the off-peak times. For example, during off-peak times the consumer in cool mode can decrease the setpoint temperature of the HVAC system and during on-peak times the consumer can increase the setpoint temperature of the HVAC system and/or turn the HVAC system off. Control of the setpoint temperature is typically through a thermostat or a user interface/display associated with the thermostat. This user-managed approach is undesirable because the consumer may not always be present in the home to operate the system during off-peak hours. This is also undesirable because the consumer is required to manually track the current time to determine what hours are off-peak and on-peak.

One proposed third party solution is to provide an energy management system where a controller "switches" the actual energy supply to the HVAC system on and off. However, there is no active control beyond the mere on/off switching. There are also currently different methods used to determine when variable electricity-pricing schemes go into effect. Also, different electrical utility companies can use different methods of communicating periods of high electrical demand to their consumer, for example, phone lines, schedules, and wireless signals sent by the electrical utility company. Other electrical utility companies simply have rate schedules for different times of day.

Unfortunately, these existing energy management approaches require some unacceptable degree of user interaction and/or, when more fully automated, can result in undesirable temperature levels in the environment being managed.

BRIEF DESCRIPTION OF THE INVENTION

As described herein, the exemplary embodiments of the present invention overcome one or more disadvantages known in the art.

One aspect of the present invention relates to a system comprising memory configured to store a temperature value based on a cost of a given energy resource, wherein the cost-based temperature value differs from a temperature value based on a temperature schedule. The system also comprises a controller operatively coupled to the memory and configured to compare the cost-based temperature value to the schedule-based temperature value, and to direct one of a cooling system and a heating system to maintain a temperature of an environment at the one of the cost-based temperature value and the schedule-based temperature value that results in an energy cost savings.

In another aspect of the present invention, the memory and controller are part of a heating and/or cooling system such as an HVAC system.

Advantageously, illustrative embodiments of the present invention provide for the HVAC system to maintain the temperature of an environment at a level that ensures energy cost savings but that is also tolerable based on user preferences.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

BRIEF DESCRIPTION OF THE DRAWINGS

In the drawings:

FIG. 10 is a diagram of a user interface, according to an embodiment of the invention.

DETAILED DESCRIPTION OF THE EXEMPLARY EMBODIMENTS OF THE INVENTION

One or more of the embodiments of the invention will be described below in the context of energy management in the context of a residential environment. However, it is to be understood that embodiments of the invention are not intended to be limited to use in residential environments or with any particular environment. Rather, embodiments of the invention may be applied to and deployed in any other suitable environment in which it would be desirable to manage the energy consumption associated with an HVAC system, a standalone heating system, or a standalone cooling system.

It is to be further understood that the types of energy consumption that are being managed here may include, but are not limited to, electricity consumption, natural gas consumption, and oil consumption. That is, by efficiently managing the temperature levels in a residential or other environment, either natural gas or oil (depending on natural resource being used) is conserved, as well as the electricity otherwise needed to operate the HVAC system. Of course, one or more embodiments of the invention may be even more generally applied to any suitable forms of resource consumption.

As illustratively used herein, the phrase "user interface" is intended to refer to an area where interaction between a human and a machine occurs including, but not limited to, a user viewing or listening to some form of information presented by the machine and/or the user inputting one or more selections or commands to the machine. In at least some of the embodiments described herein, the machine is an HVAC system and the human is the user or consumer, and interaction between the user and the HVAC system is via a user interface such as a user interface that is associated with a thermostat. The user interface can be an integral part of the thermostat module, separate from the thermostat module, or some combination thereof.

Before describing illustrative temperature control embodiments of the invention, we describe an illustrative HVAC system (FIGS. 1 and 2) and an illustrative energy management system (FIG. 3) in which one or more of such temperature control embodiments may be implemented.

Figure 1:
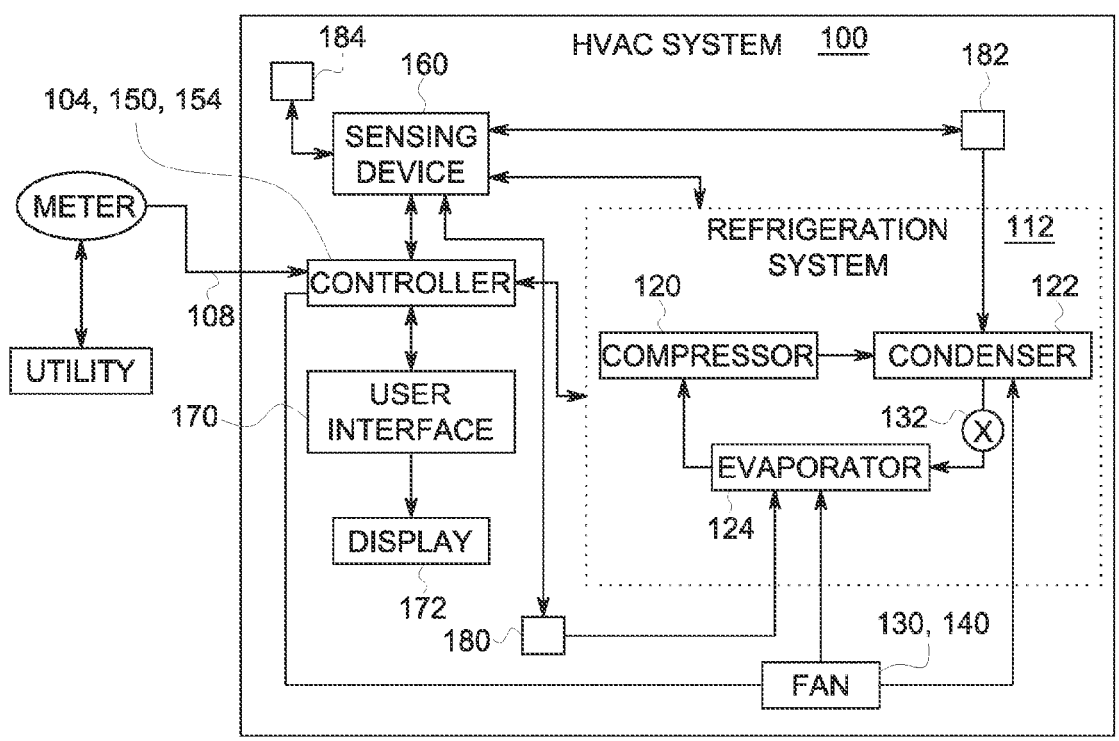
FIG. 1 is a diagram of an HVAC system, in accordance with an embodiment of the invention.

FIG. 1 illustrates an HVAC system 100 for conditioning air of a room according to an embodiment of the invention. The HVAC system 100 comprises one or more power consuming features/functions including at least one temperature controlling element for one of heating and cooling air. A controller 104 is operatively connected to each of the power consuming features/functions. The controller 104 can, in one embodiment, include a microcomputer on a printed circuit board (including one or more processor devices and one or more memory devices) which is programmed (via one or more software programs stored thereon and executed thereby) to selectively control the energization of the power consuming features/functions.

The controller 104 is configured to receive and process a signal 108 indicative of a utility state, for example, availability and/or current cost of supplied energy. There are several ways to accomplish this communication, including but not limited to PLC (power line carrier, also known as power line communication), FM, AM SSB, WiFi, ZigBee, Radio Broadcast Data System, 802.11, 802.15.4, etc. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

Note that the signal 108 provides the HVAC system 100 with the energy cost information for given time intervals over a time period (e.g., day, week, month, year, etc.). For example, this energy price information provided in accordance with the signal 108 is what is used by temperature control schedules described below in the context of FIGS. 4-8 to determine which temperature offset and/or temperature setpoint to apply. Note that the term "cost" with respect to energy as used herein includes, but is not limited to, specific cost tiers or levels (e.g., low, medium, high, critical, etc.), specific prices (e.g., $0.10 per kWH (kilowatt hour), etc.), or some combinations thereof.

The controller 104 can operate the HVAC system 100 in one of a plurality of operating modes, including a normal operating mode and an energy savings mode in response to the received signal. Specifically, the HVAC system 100 can be operated in the normal mode in response to a signal indicating an off-peak demand state or period and can be operated in an energy savings mode in response to a signal indicating a peak demand state or period. As will be discussed in greater detail below, the controller 104 is configured to selectively adjust and disable at least one of the one or more power consuming features/functions to reduce power consumption of the HVAC system 100 in the energy savings mode. It should be appreciated that the controller can be configured with default settings which govern normal mode and energy savings mode operation. Such settings in each mode can be fixed while others adjustable to user preference and to provide response to load shedding signals.

Figure 2:
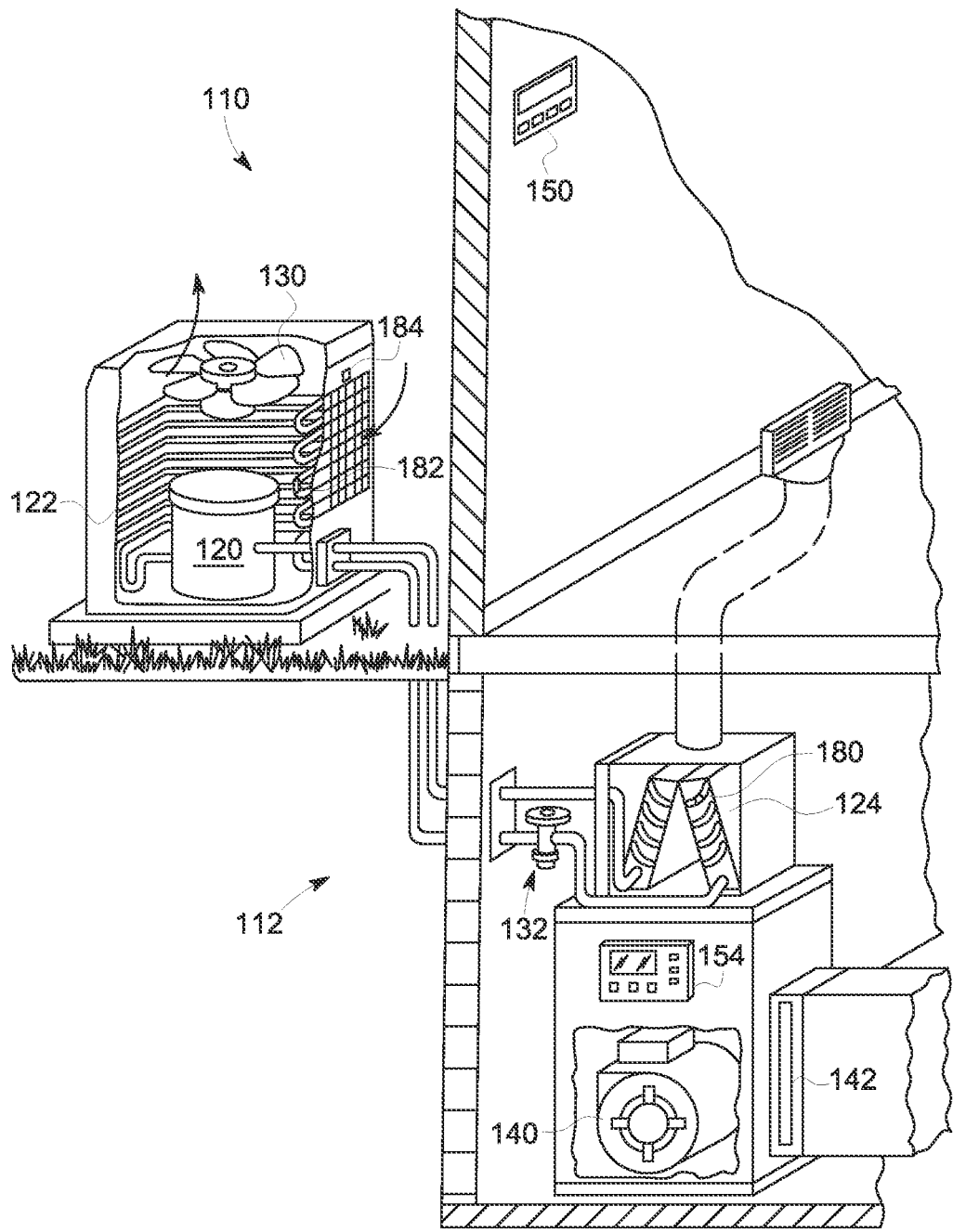
FIG. 2 is a diagram of the HVAC system of FIG. 1 in a given environment.

An exemplary embodiment of the HVAC system 100 is illustrated in FIG. 2. In this embodiment, the HVAC system 100 is a central air conditioning system 110 and the at least one temperature controlling element is a refrigeration system 112 including a setpoint temperature. The refrigeration system is a closed loop system defining passages for a refrigerant fluid to flow and includes a compressor 120, a condenser 122 and an evaporator 124 in a refrigerant flow relationship. As is well known, the compressor 120, which can be driven by electrical energy or other suitable power sources, compresses a low-pressure refrigerant vapor exiting the evaporator 124 into a high pressure and temperature vapor. This high pressure vapor refrigerant rejects heat to outdoor ambient air in the condenser 122 condensing into a liquid. As depicted, the condenser can comprise one or more coils or tubes adapted to receive the hot refrigerant from the compressor. An outdoor fan 130 blows ambient air across the condenser. The liquid refrigerant then passes through an expansion device 132 such as a thermostatic expansion valve or a fixed orifice device and becomes a low pressure two-phase refrigerant. The expansion valve 132 can be located on a conduit which is in communication with the evaporator 124 to meter the flow of liquid refrigerant entering the evaporator at a rate that matches the amount of refrigerant being boiled off in the evaporator. This refrigerant then enters the indoor coils of the evaporator 124 and absorbs heat from the indoor air circulated by an indoor fan or blower 140. An air filter 142 is provided for filtering the air flowing through the blower and into the evaporator. Cool, dehumidified air is then blown through ductwork into rooms to be cooled. The evaporator 124 then discharges refrigerant to a conduit which is in communication with the compressor 120. The refrigerant vapor then enters the compressor 120 and the cycle repeats. In effect, indoor air is cooled by absorbing heat from indoor air and rejecting the heat to outdoor air in a vapor compression based air-conditioning system.

A thermostat 150 controls the air conditioning system using dry bulb temperature alone. In the exemplary central air conditioning system 110, the thermostat 150 is one module of the controller 104 which controls the operation of the system 110. The controller 104 can also include a separate control module 154 which can be located on a blower housing; although, this is not required. As shown in FIG. 1, a sensing device 160 is operatively connected to the controller 104. According to one aspect, the sensing device is integrated with the controller 104; although, this is not required. The sensing device 160 has sensor inputs for indoor air dry-bulb temperature, indoor relative humidity, outdoor air temperature, outdoor relative humidity, supply air temperature and return air temperature. The output of the sensing device 160 is processed by the controller 104. The controller, in response to the sensing device output and depending on a setpoint temperature of the refrigeration system, selectively actuates the refrigeration system 112.

With reference again to FIG. 1, a control panel or user interface 170 is provided on the HVAC system 100 and is operatively connected to the controller 104. The control panel 170 can include a display 172 and control buttons for making various operational selections, such as setting the setpoint temperature of a temperature controlling element. A light source can be provided for illuminating the user interface.

If the controller 104 receives and processes an energy signal indicative of a peak demand period at any time during operation of the HVAC system 100, the controller makes a determination of whether one or more of the power consuming features/functions should be operated in the energy savings mode and if so, it signals the appropriate features/functions of the HVAC system 100 to begin operating in the energy savings mode in order to reduce the instantaneous amount of energy being consumed by the HVAC system. The controller 104 determines what features/functions should be operated at a lower consumption level and what that lower consumption level should be, rather than an uncontrolled immediate termination of the operation of specific features/functions.

In order to reduce the peak energy consumed by the HVAC system 100, the controller 104 is configured to at least one of selectively adjust and disable at least one of the one or more above described power consuming features/functions to reduce power consumption of the HVAC system 100 in the energy savings mode. Reducing total energy consumed also encompasses reducing the energy consumed at peak times and/or reducing the overall electricity demands. Electricity demands can be defined as average watts over a short period of time, typically 5-60 minutes. Off peak demand periods correspond to periods during which lower cost energy is being supplied by the utility relative to peak demand periods.

As set forth above, the HVAC system 100 has a setpoint temperature in the normal operating mode. To reduce the power consumption of the HVAC system 100 in the energy savings mode, the controller 104 is configured to adjust (increase or decrease) the setpoint temperature of the HVAC system to precipitate less refrigeration system on time (i.e., compressor on time) in the energy savings mode. For example, if the HVAC system 100 is being used to cool the room air, the controller 104 can increase the setpoint temperature. If the HVAC system 100 includes a heat pump cycle to heat the room air, the controller 104 can decrease the setpoint temperature. To precipitate less compressor on time, according to one aspect, a duty cycle of the compressor 120 can be adjusted (for example, by time or by setpoint) in the energy savings mode. According to another aspect, to reduce the current draw of the compressor 120 in the energy savings mode, the speed and/or capacity of the compressor can be varied or reduced. A controllable expansion valve can also be implemented. According to yet another aspect, the refrigeration system 112 can be temporarily deactivated in the energy savings mode. In this instance, the fan 140 can continue to operate to limit discomfort to the consumer. The light source of the user interface 170 can also be dimmed or deactivated in the energy savings mode. The speed of the fan 130 and/or fan 140 can also be varied and/or reduced or the fan 130 and/or fan 140 can be deactivated in the energy savings mode.

Other power load reducing measures may include reducing before on-peak hours the setpoint temperature (pre-chilling) and increasing the setpoint temperature during on-peak rates. For example, shortly before peak rate time, the temperature setting of the central air conditioning system 110 could be decreased by 1-2 degrees (during off-peak rates). One skilled in the art of heat transfer will appreciate that this pre-chilling maneuver would need to occur a predetermined time prior to the peak demand period to allow enough time for the environs to reach the pre-chilled setpoint temperature. The system could "learn" the amount of time required for a given pre-chill at a specific ambient condition and then invoke the pre-chill accordingly. Some communication line with the utility including but not limited to the communication arrangements hereinbefore described could be established so that the utility can send a signal in advance to decrease the room temperature during off-peak rates as a pre-chill maneuver and, in turn, increase the setpoint temperature during on-peak rates.

The determination of which power consuming features/functions are operated in an energy savings mode may depend on whether the HVAC system 100 is currently operating in the cooling cycle or the heating cycle. In one embodiment, the controller 104 may include functionality to determine whether activation of the energy savings mode for any power consuming features/functions would potentially cause damage to any feature/function of the HVAC system 100 itself or would cause the HVAC system to fail to perform its intended function. If the controller 104 determines that an unacceptable consequence may occur by performing an energy saving action, such as deactivating or curtailing the operation of the refrigeration system 112, the controller may opt-out of performing that specific energy saving action or may institute or extend other procedures.

Further, the controller 104 can be configured to monitor various parameters of the refrigeration system 112 as well as the home environs and alert a user of a fault condition of the HVAC system 100. For example, the controller can be configured to monitor or extrapolate faults of at least one of the capacity of the compressor 120, refrigerant charge level and air filter system and alert a user of a respective low capacity, low charge level and severely clogged air filter system. To this end, and as shown in FIGS. 1 and 2, the sensing device 160 can include a first sensing device 180, a second sensing device 182 and a third sensing device 184. The first sensing device 180 measures a temperature of the evaporator 124. The second sensing device 182 measures a temperature of the condenser 122. The third sensing device 184 measures outside ambient temperature. The thermostat of the HVAC system 100 is set to an indoor setpoint temperature by the user and senses the actual indoor ambient temperature. The controller 104 is configured to record the respective evaporator, condenser and outdoor ambient temperatures along with run times of the compressor 120 during operation of the HVAC system 100. The controller 104 can then utilize the recorded temperatures and run times to identify a fault condition. The controller can be configured to compare the run times associated with an outdoor ambient temperature and setpoint or actual room temperature to identify a fault condition.

Figure 3:
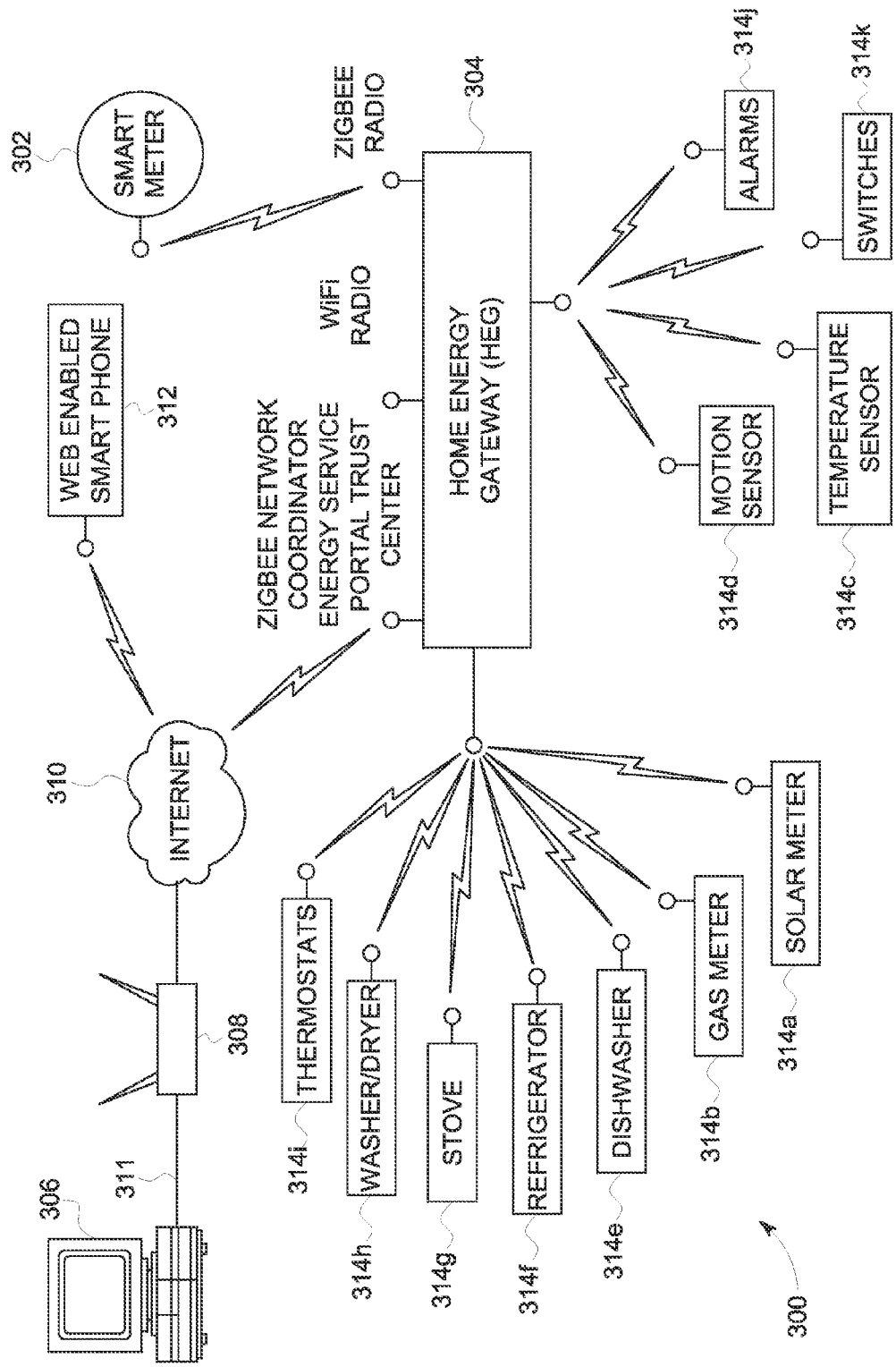
FIG. 3 is a diagram of an energy management system, in accordance with an embodiment of the invention.

FIG. 3 is an exemplary implementation of a home/premises energy management system 300 according to the present application. It is to be appreciated that the energy management system 300 can be deployed throughout the same environment as the HVAC system shown in FIGS. 1 and 2.

The main source of information flow for the home (or other environment in which system 300 may be deployed) is shown as smart electric meter 302 acting as trust center, coordinator, and/or and energy service portal (ESP), and which is configured in operative connection/communication with a home energy gateway (HEG) 304. Note that the controller 104 of the HVAC system 100 in FIGS. 1 and 2 may be part of the HEG 304, separate from the HEG 304, or some combination thereof.

It is well known that the functions of smart meter 302 may be separated into different devices. For example, if the home does not have a smart meter 302, so the electric meter functions only as a meter to provide consumption information, other components can be used to provide the additional capabilities. For example, homes without a smart meter 302 can have the metering functionality of smart meter 302 replaced with a simple radio and current transformer (CT) configuration. Also, there are devices that can be placed on the outside of the meter to communicate consumption by reading pulse counts or the rotating disk of the meter. In this embodiment, smart meter 302 is shown with an IEEE 802.15.4 radio (such as in the configuration of a ZigBee type; where ZigBee is a specification for a suite of high level communication protocols using small, low-power digital radios based on the IEEE 802.15.4 standard for wireless home area networks (WHANs), but the meter could also communicate by a number of other standards such as IEEE 1901 (e.g., Home Plug Green Phy or Home Plug AV specifications), among others.

Computer 306 (such as a desktop, laptop of other computing device) is in operative attachment to modem/router 308, a common manner of attaching computers to Internet 310. In FIG. 3, computer 306 is connected to modem/router 308 by a wired IEEE 802.3 (Ethernet) connection 311. However, it is to be appreciated the connection could be made by other known arrangements such as an IEEE 802.11 (Wi-Fi) connection, power line communication/power line carrier (PLC) connection, among others. In one embodiment, the PLC connection is made using an adaptor such as sold by Netgear Inc. of San Jose Calif. or other manufacturer for that purpose. Also, although a modem/router arrangement is shown in system 300, it is not required, and the system would function for its primary purpose of monitoring and displaying energy consumption information without such an arrangement. In that case, computer 306 would connect directly to HEG 304 via a wired or wireless connection.

A Web/Internet enabled smart phone (or other smart handheld device) 312 is configured to communicate with HEG 304 for displaying data and configuring accessories (such as home appliances 314e-314k). Accessories 314a-314k fall into two main categories: sensors and devices (where, depending on how the accessories are used, some will fall into both categories).

Examples of sensors include solar meters 314a, gas meters 314b, temperature sensors 314c, motion sensors 314d, and appliances reporting their power consumption (such as dishwashers 314e, refrigerators 314f, stoves 314g, washers/dryers 314h, etc.). Devices include thermostats 314i, alarms 314j and simple switches 314k, along with the appliances (e.g., dishwashers 314e, etc.), when performing their normal functions. The foregoing are just some examples of accessories to which the concepts of the present application will apply. Note that thermostat 314i can be the same as thermostat 150 in the HVAC system 100 of FIG. 1.

The HEG 304 is comprised of one or more processor devices and one or more memory devices. In one embodiment, the HEG 304 is constructed with computational capabilities and multiple communication technologies but without its own integral display screen, its audio visual display capability being limited to status indicators (although, this is not required). Rather, it is configured to communicate with remote devices having user interface displays, such as for example, personal computers, smart phones, web-enabled TV, etc., so as to communicate with the user via these displays. In contrast to existing controllers (such as a HEM) used in home energy systems, HEG 304 is significantly smaller, cheaper, and consumes less power. The HEG 304 also has the capability of operating over multiple communication networks which use different formats, protocols, and bandwidths. This allows HEG 304 to acquire and manipulate (e.g., reformat) data of one communication network (e.g., that which monitors/controls the home appliances) and to supply that manipulated data to another communication network (e.g., to the consumer electronics network, such as to a home computer, smart phone, web-enabled TV, etc.), even though these networks are not generally compatible. The manipulation or reformation includes putting the data in a format and/or location whereby it is accessible by the other communication networks. In some cases, the reformatting may only need to provide the data to a database accessible to the other communication networks, while in still other cases, the system translates the data from a protocol understandable by one communication into a protocol understandable by the other communication networks.

As another example, HEG 304 is connected to system loads (e.g., the home appliances, etc.) over one type of communication network, to the utility company over a different communication network, and to a display over a third different communication network. In one particular embodiment, connection to the display is via a Wi-Fi communication network, connection to the utility company (over the meter) is via a ZigBee communication network, and connection to the home accessory (sensor/device/appliance) network is over the third. Alternatively, in a home where the accessories and utility company's rules are different, the data could be structured differently. For example, the whole home consumption could be available over the Internet or via a ZigBee meter on the second network. Further, in addition to the display, several home automation accessories including pool controllers, emergency generators, and storage batteries are designed to be accessed over an Ethernet using an Internet Protocol (IP).

Given the above-described exemplary HVAC system 100 and exemplary energy management system 300, we now describe various temperature control schedules, in the context of FIGS. 4-8, that may be employed by either of the two systems to attempt to achieve energy savings (e.g., part of the energy savings mode of the HVAC system 100 mentioned above). It is to be appreciated that such schedules may be stored in memory and executed by controller 104 of HVAC system 100, HEG 304 of system 300, some other component(s) of the systems, or some combinations thereof. The systems allow for user input and selection of setpoints as will be seen, in response to user preferences and/or energy price information as may be provided to the systems via one or more signals received from one or more utility companies.

Figure 4:
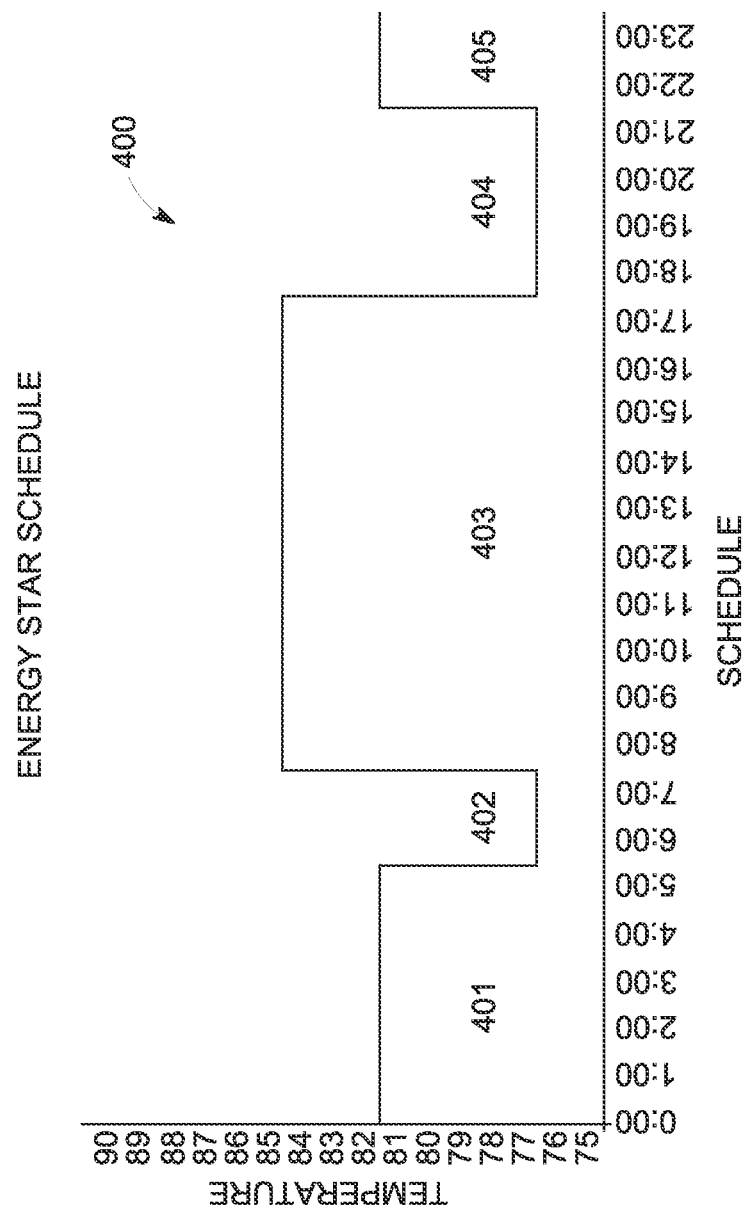
FIG. 4 is a diagram of a temperature control schedule.

FIG. 4 graphically depicts a temperature control schedule 400 for a thermostat based on the Energy Star schedule. As is known, Energy Star is a joint program of the U.S. Environmental Protection Agency and the U.S. Department of Energy that is intended to help energy consumers save money and to protect the environment through energy efficient products and practices. Thus, it is assumed that a thermostat is programmed (in accordance with controller 104 and/or HEG 304) to follow the temperature schedule depicted in the graph of FIG. 4 over the course of the day in order to assist in maintaining energy-efficient temperature conditions in an environment in which the thermostat is deployed. As is known, such a thermostat is operatively coupled to an HVAC system and/or energy management system (HEG) which either activates/deactivates a heating subsystem of the HVAC system or a cooling subsystem thereof in order to maintain the temperature schedule programmed into the thermostat for the given environment. While this example shows the recommended Energy Star schedule, it is common to provide a user interface to a thermostat to allow a consumer to edit this schedule according to when they are home and away, and what temperature ranges they are willing to accept.

So as shown in FIG. 4, which assumes deployment in a residential environment such as a home, between 12:00 am and 6:00 am (time interval 401), the thermostat schedule causes the temperature of the home to be maintained at 82 degrees (note that degrees are given in Fahrenheit unless otherwise specified). Then, between 6:00 am and 8:00 am (time interval 402), the thermostat schedule causes the temperature of the home to decrease to 77 degrees, i.e., the cooling subsystem brings the temperature of the home down from 82 degrees to 77 degrees in response to the thermostat setting. This change in temperature between these two time intervals is based on the assumption that residents of the home will be sleeping during the first time interval and thus can tolerate a warmer temperature, but will be awake and getting ready for work or school during the second time interval and thus would prefer a cooler temperature. Then, in a third time interval 403, i.e., between 8:00 am and 6:00 pm, the thermostat schedule causes the temperature of the home to be maintained at 85 degrees. This is when the residents are presumably not at home, and thus a warmer temperature is permissible. In time interval 404, between 6:00 pm and 10:00 pm, the illustrated schedule dictates that the temperature of the home be maintained at 77 degrees (again, when residents are presumed to be home). Lastly, in time interval 405, between 10:00 pm and 12:00 am when residents are presumable sleeping again, the temperature is maintained at 82 degrees (which then leads to a repeat of the schedule of FIG. 4 starting at 12:00 am the next day).

Figure 5:
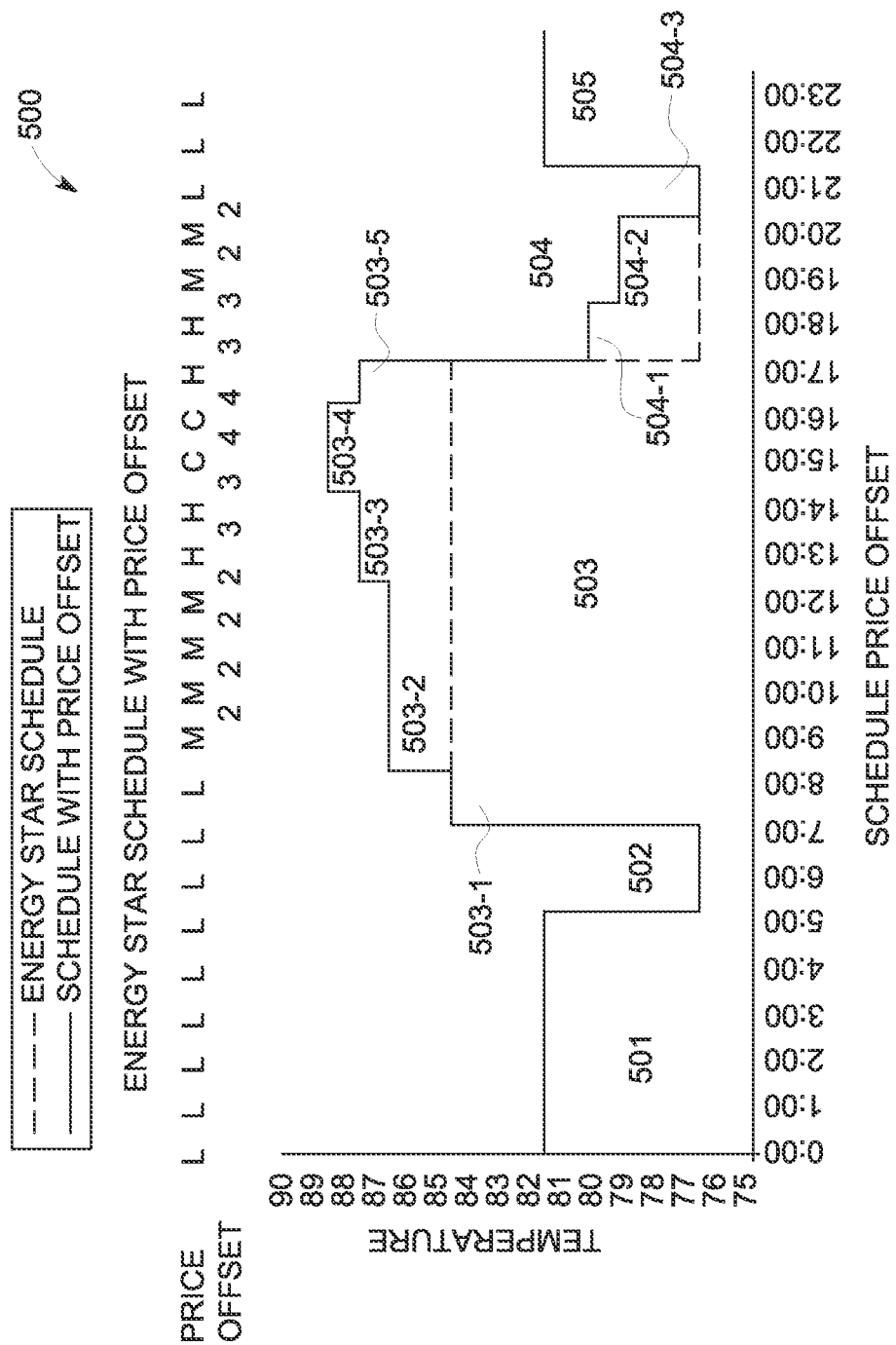
FIG. 5 is a diagram of another temperature control schedule.

FIG. 5 graphically depicts a temperature control schedule 500 for a thermostat based on the Energy Star schedule with temperature offsets that are a function of the price of energy (this is referred to in the figure as an Energy Star schedule with price offsets). That is, as compared to temperature control schedule 400 in FIG. 4 with time intervals 401 through 405, it is noted that schedule 500 adjusts the Energy Star recommended temperature in certain intervals based on the price of energy. More specifically, schedule 500 takes into account the price of energy to run the HVAC system at each hour interval of the day and applies an offset to the Energy Star recommended temperature. So assume that the price of energy over the course of the day can range from low (L), medium (M), high (H), to very high or critical (C). When the energy price is defined as low (L), then the schedule follows the Energy Star recommended temperature levels, as shown in time intervals 501, 502 and the first part of 503 (i.e., 503-1) where temperature level is maintained at 82 degrees in time interval 501, 77 degrees in time interval 502, and 85 degrees in time interval 503-1.

However, when the energy price is defined as medium (M), in time interval 503-2, note that a two degree offset is applied via schedule 500 to the Energy Star recommended temperature for that time interval (85 degrees) such that a temperature level of 87 degrees is maintained by the HVAC system. Then, in interval 503-3, when the energy price is high (H), a three degree offset is applied to the Energy Star recommended temperature for that time interval (85 degrees) such that a temperature level of 88 degrees is maintained. When the energy price goes to critical (C) in time interval 503-4, a four degree offset is applied, raising the temperature to 89 degrees. In time interval 503-5, when the price goes back down to high (H), the three degree offset is applied.

Similarly, it is evident that in the first part of time interval 504, i.e., time interval 504-1, a three degree offset is applied corresponding to a high energy price, and a two degree offset is applied in 504-2 corresponding to a medium energy price. Note then how no offset is applied in time interval 504-3 or time interval 505 since the energy price goes back down to the low level.

It would seem that there is only advantage in this application of offsets based on the price of energy, i.e., consumer uses less energy during times when the price of energy is relatively high. However, it is realized that certain offsets cause the temperature in the residence to be at an unacceptable level for pets and plants that remain in the home even when no people are present. Perhaps 89 degrees is too warm for certain plants and pets that are in the residence. Also, since the temperature was let rise to 89 degrees, the consumer may find that the home is not adequately cooled by the time he/she returns. So, to avoid these conditions, the consumer may manually decrease the base temperature, e.g., 85 degrees to 81 degrees, so that when the four degree offset is applied, the temperature will not go above the recommended level of 85 degrees. However, this requires the consumer to manually adjust the thermostat and remember to adjust in back during times when the energy prices may differ from those assumed in schedule 500.

Figure 6:
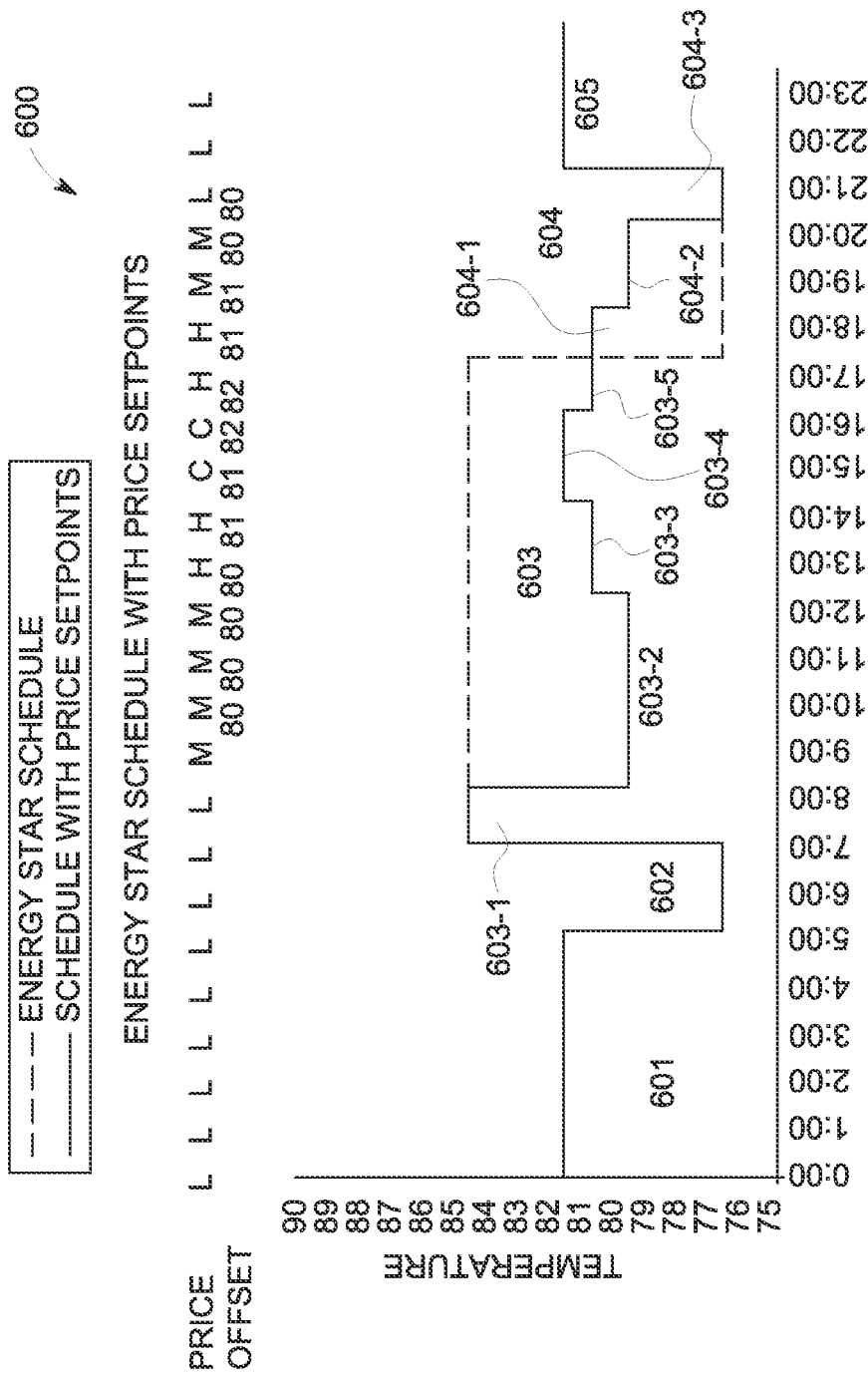
FIG. 6 is a diagram of yet another temperature control schedule.

FIG. 6 graphically depicts a temperature control schedule 600 for a thermostat based on the Energy Star schedule with price setpoints. That is, as compared with schedule 500 in FIG. 5, schedule 600 provides for a specific setpoint temperature for a given price of energy. As will be explained below, these price-sensitive setpoints can be entered (or selected as defaults) by the consumer on a thermostat. Alternatively, for maximum energy savings, they can be coded into the thermostat and not adjustable.

Thus, as shown in FIG. 6, when the price is at a low (L) level, i.e., time intervals 601, 602, and the first part of 603 (603-1), the temperature is maintained at the Energy Star recommended level. However, when the price goes to a medium (M) level, i.e., time interval 603-2, the schedule calls for a setpoint of 80 degrees. Then, in time interval 603-3, when the price is high (H), an 81 degree setpoint is employed. An 82 degree setpoint is employed in time interval 603-4 when the price is critical (C), and a setpoint of 81 degrees is employed in time interval 603-5 when the price returns to high. Time interval 604-1 has a setpoint of 81 degrees (H) and 604-2 is maintained at an 80 degree setpoint corresponding to a medium (M) price level, while time intervals 604-3 and 605 are maintained at the Energy Star recommended temperatures.

Note that setpoint-based schedule 600 in FIG. 6 overcomes the issues raised above regarding the offset-based schedule 500 in FIG. 5 by providing specific setpoint temperatures that are considered tolerable by the consumer (as opposed to the temperature offsets that raise the temperature to undesirable levels in schedule 500) during time intervals when the price is medium, high or critical. However, note that some of these setpoint temperatures end up being lower than the Energy Star recommended temperatures for certain time intervals (i.e., 603-2, 603-3, 603-4 and 603-5), thus maintaining the temperature at a level lower than the consumer was willing to tolerate under the Energy Star schedule (85 degrees). This causes the consumer to have to unnecessarily pay more for energy consumption during those time intervals.

Figure 7:
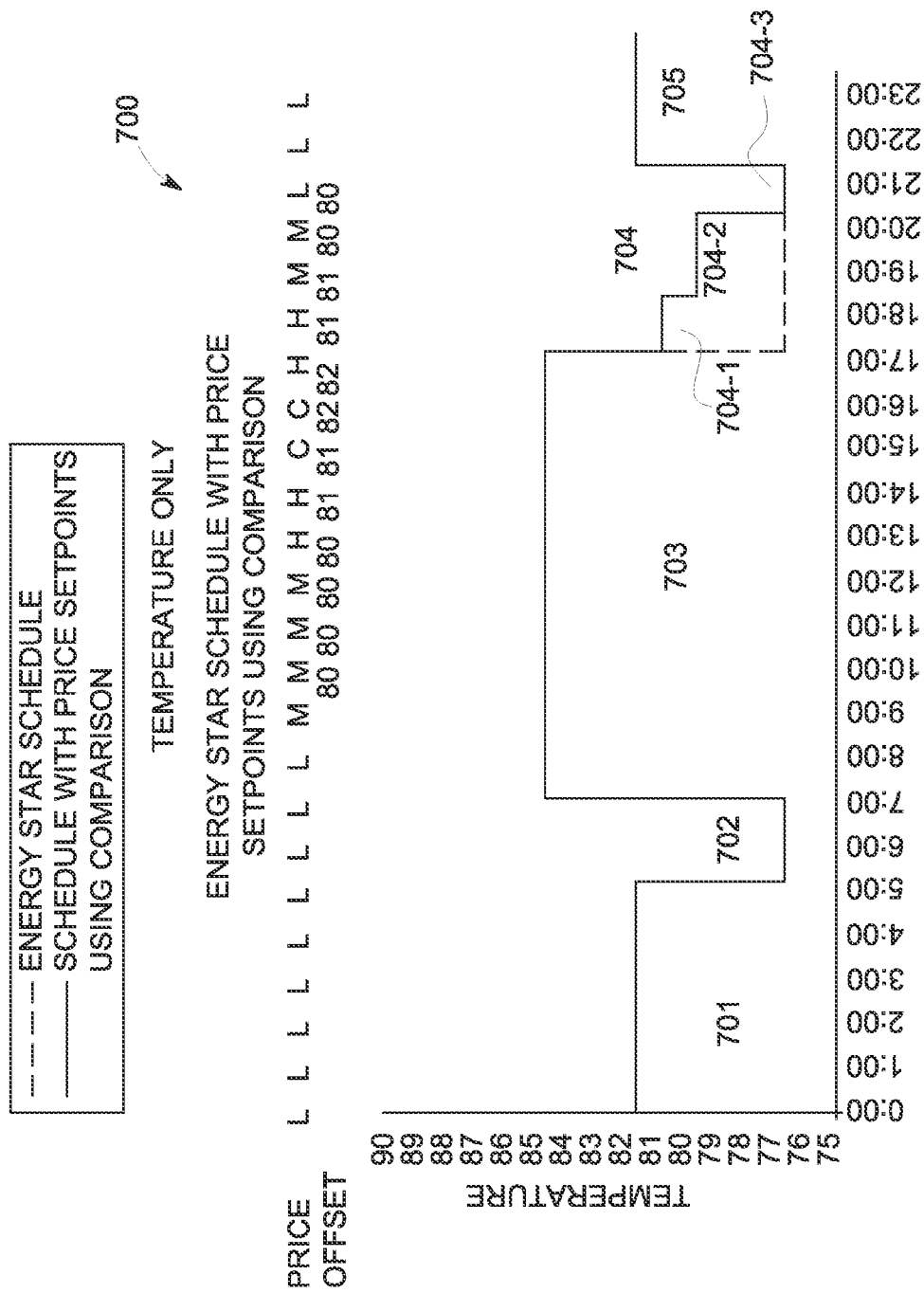
FIG. 7 is a diagram of a temperature control schedule, in accordance with an embodiment of the invention.

FIG. 7 illustrates a temperature control schedule 700, according to an embodiment of the invention, that overcomes the issues associated with schedule 600 in FIG. 6. Note that the same price-sensitive setpoints are selected in schedule 700 as in schedule 600, and also that the temperatures that are maintained in time intervals 701, 702, 704 and 705 are the same as those maintained in time intervals 601, 602, 604 and 605, respectively. The difference is in time interval 703 as compared to time interval 603. Recall that, as pointed out above, the temperatures maintained in time intervals 603-2, 603-3, 603-4 and 603-5 are at a level lower than the consumer was willing to tolerate under the Energy Star schedule (85 degrees), thus causing the consumer to have to unnecessarily pay more for energy consumption. Advantageously, in accordance with schedule 700, a comparison is performed between the setpoint temperature and the Energy Star recommended temperature, and the temperature that costs the consumer less (based on energy price) to maintain is selected as the actual temperature that is implemented by the HVAC system.

Thus, in this example shown in FIG. 4 (which assumes that the HVAC system is performing a cooling function), note that the setpoint temperatures implemented in time interval 703 for prices ranging from medium (M) to critical (C) are ignored in favor of the Energy Star recommended temperature of 85 degrees. This is due to the comparison described above. Thus, the HVAC system will operate at the Energy Star recommended temperatures in time interval 703 despite the lower setpoint temperatures that were selected by the consumer for medium through critical pricing. Note also that the above-described comparison in time intervals 704-1 and 704-2 works in favor of the setpoint temperatures (81 and 80 degrees, respectively) since they are higher than the Energy Star recommended temperature (77 degrees), and thus would cost the consumer less to implement.

Figure 8:
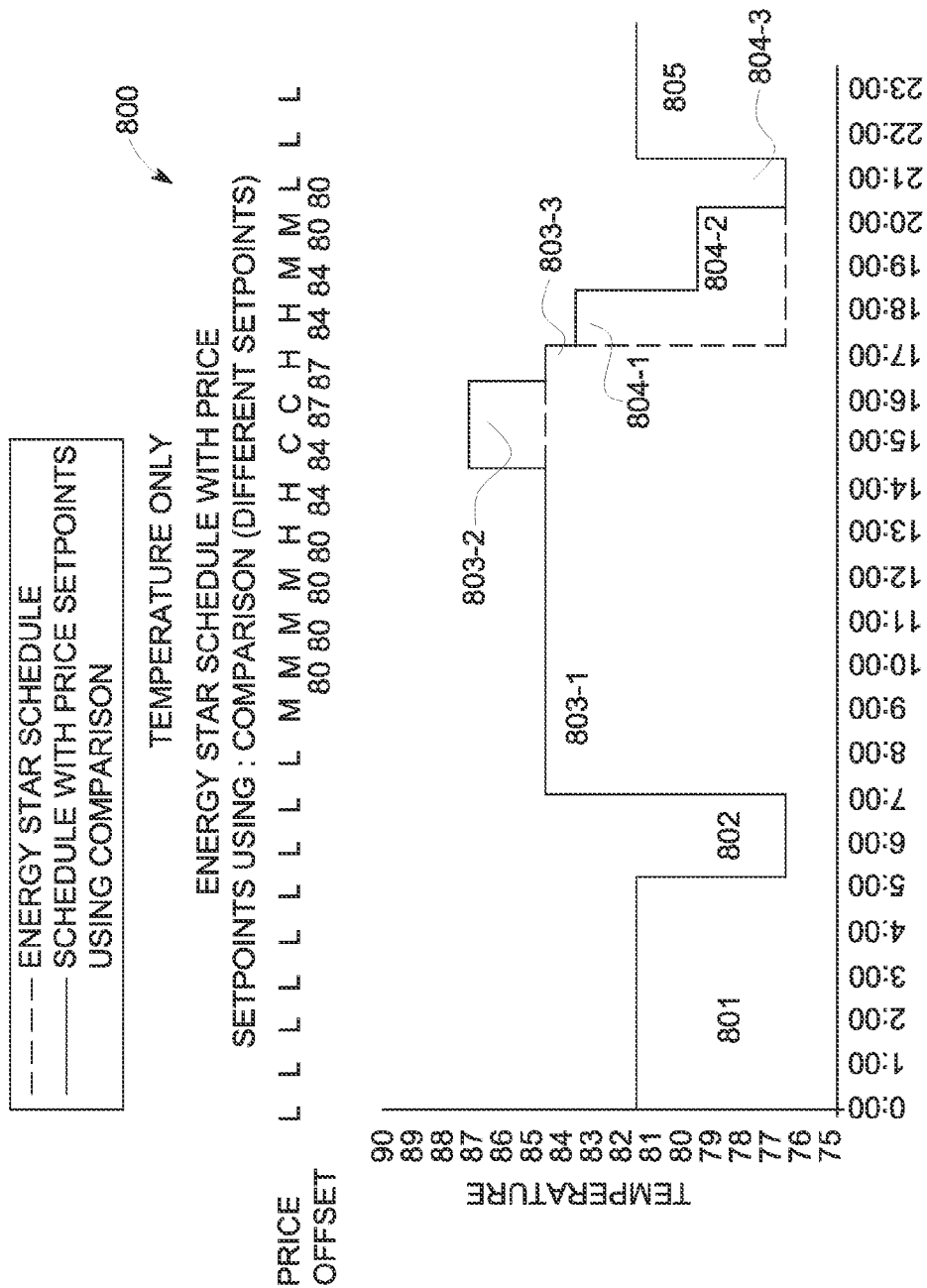
FIG. 8 is a diagram of a temperature control schedule, in accordance with another embodiment of the invention.

FIG. 8 illustrates a temperature control schedule 800, according to another embodiment of the invention, that implements the same comparison as described above for schedule 700. Except, in schedule 800, it is assumed that the consumer selected different setpoint temperatures for high (H) and critical (C) energy prices. So, time intervals 801, 802, 803-1, 803-3, 804-2, 804-3 and 805 operate the same as time intervals 701, 702, 703-1, 703-3, 704-2, 704-3 and 705, as a result of the comparison operation. However, note that when the setpoint for the critical energy price (87 degrees) is higher than the Energy Star recommended temperature (85 degrees) in time interval 803-2, the setpoint is selected. The same occurs in time interval 804-1 where setpoint of 84 degrees is selected over the Energy Star recommended temperature of 77 degrees.

Figure 9:
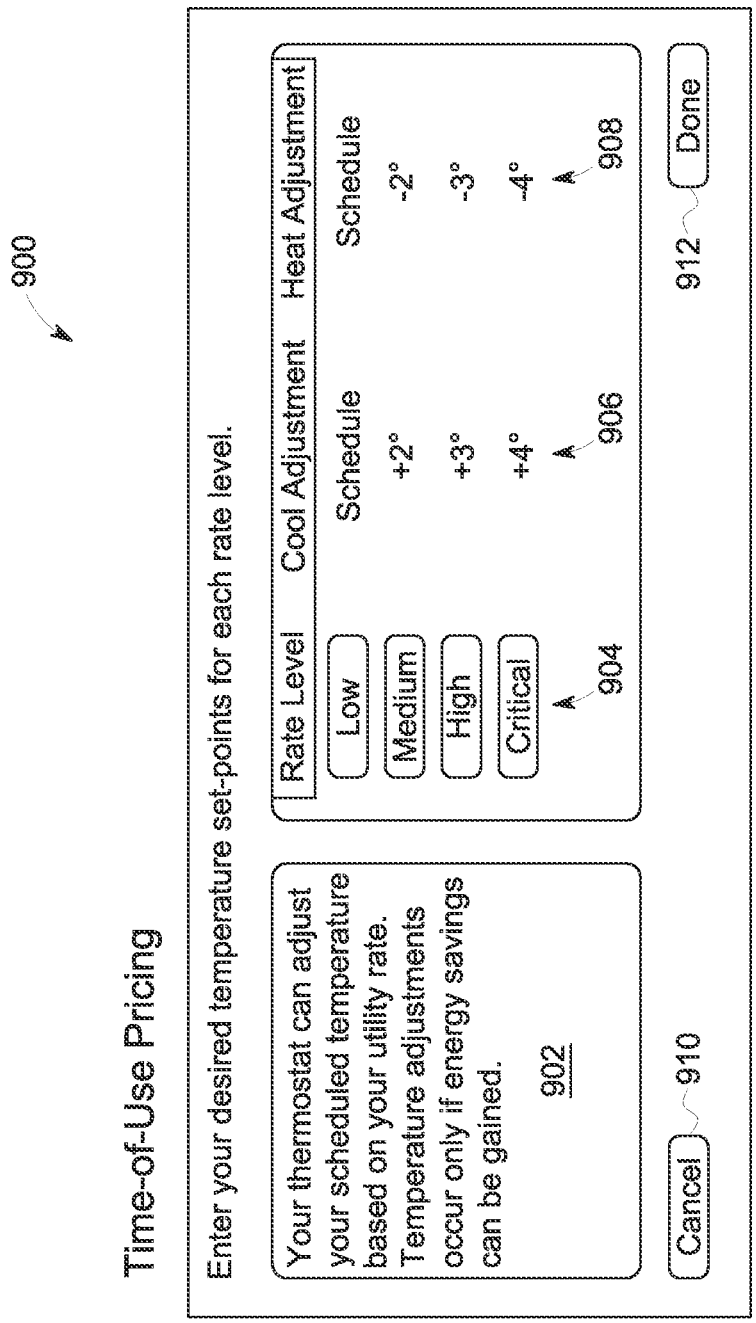
FIG. 9 is a diagram of a user interface associated with the temperature control schedule of FIG. 5.

FIG. 9 is a diagram of a user interface 900 associated with the temperature control schedule of FIG. 5. User interface 900 is where the consumer is able to select and enter temperature offsets based on energy price levels, as explained above. By way of example, user interface 900 can be part of one or more elements of HVAC system 100 (FIGS. 1 and 2) and/or energy management system 300 (FIG. 3), e.g., controller 104, thermostat 150, user interface 170, display 172, HEG 304, computer 306, thermostat 314i, etc.

As shown, the user interface 900 comprises several features for presenting the consumer with options and information and for allowing the consumer to enter selections and other information. For example, user interface 900 has an information section 902, a rate level section 904, a cool adjustment section 906, a heat adjustment section 908, a cancel button 910, and a done button 912. Information section 902 indicates to the consumer that the thermostat can adjust the scheduled temperature based on the utility rate (energy price level), but such temperature adjustments will only occur if energy savings can be achieved, as explained above. Then, the consumer can view the rate levels (column 904) and the default temperature offsets (column 906 for cooling system and column 908 for heating system), and decide to cancel (button 910) or accept (button 912) the settings. Note that, as implemented in the examples above, the low price level does not have an offset but rather implements a schedule (e.g., Energy Star recommended schedule). Features can be added to the user interface 900 to allow the consumer to enter other offsets. This can include, but is not limited to, increase/decrease icons and/or text entry fields.

FIG. 10 is a diagram of a user interface 1000, according to an embodiment of the invention. For example, user interface 1000 can be used in association with the temperature control schedules shown in FIGS. 7 and 8. User interface 1000 is an example of where the consumer is able to select and enter temperature setpoints based on energy price levels, as explained above. As with user interface 900, user interface 1000 can be part of one or more elements of HVAC system 100 (FIGS. 1 and 2) and/or energy management system 300 (FIG. 3), e.g., controller 104, thermostat 150, user interface 170, display 172, HEG 304, computer 306, thermostat 314i, etc.

As shown, the user interface 1000 comprises several features for presenting the consumer with options and information and for allowing the consumer to enter selections and other information. For example, user interface 1000 has an information section 1002, a rate level section 1004, a cool adjustment section 1006, a heat adjustment section 1008, an opt-out section 1010, a cancel button 1012, and a done button 1014. Information section 1002 indicates to the consumer that the thermostat can adjust the scheduled temperature based on the utility rate (energy price level), but such temperature adjustments will only occur if energy savings can be achieved, as explained above. Also, the information section explains that the consumer can select one or more price levels for which they can opt out of the selected setpoint temperature and opt for a schedule (e.g., Energy Star recommended schedule). This is done by selecting one or more of the selection features in column 1010. The consumer can view the rate levels (column 1004) and the default temperature setpoints (column 1006 for cooling system and column 1008 for heating system), and decide to cancel (button 1012) or accept (button 1014) the settings. Note that, as implemented in the examples above, the low price level does not have an offset but rather implements a schedule (e.g., Energy Star recommended schedule). Also, note that selection features are provided to allow the consumer to enter other setpoints, e.g., increase/decrease icons as shown. However, text entry fields or other input features can be implemented as an alternative.

Figure 11:
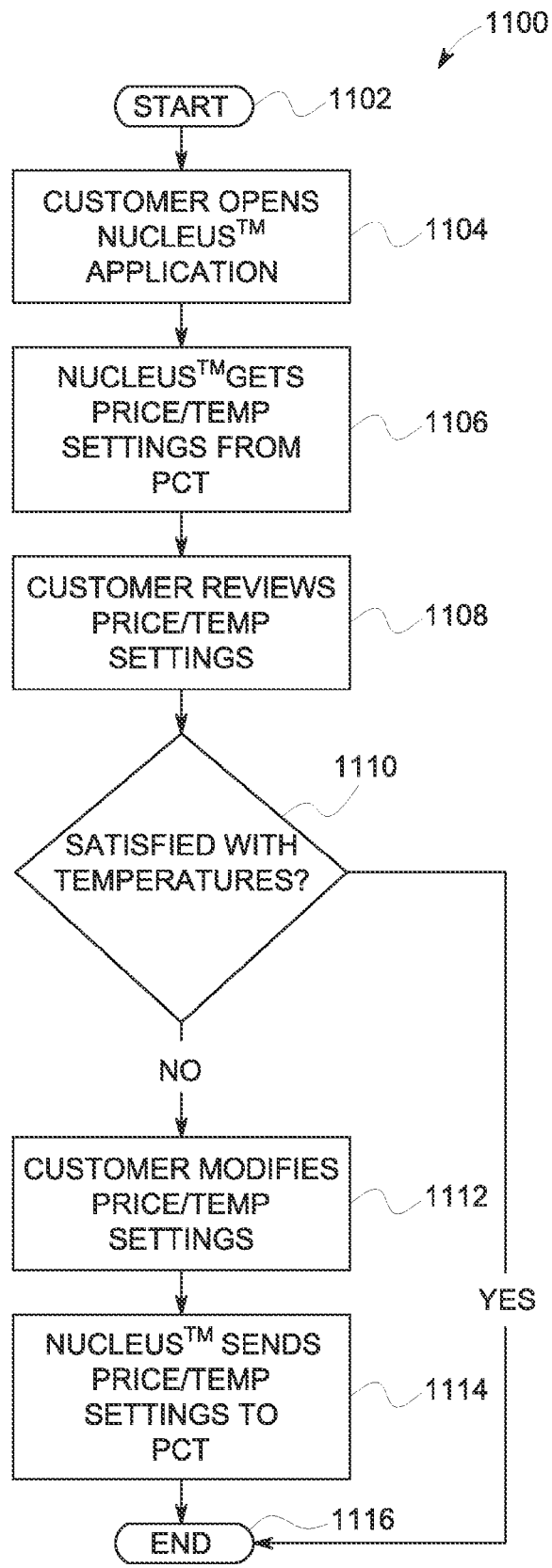
FIG. 11 is a diagram of a temperature control methodology, in accordance with an embodiment of the invention.

FIG. 11 is a diagram of a temperature control methodology 1100, in accordance with an embodiment of the invention. In this illustrative embodiment, it is assumed that the environment in which the temperature is being controlled includes an energy management system 300 (FIG. 3) including computer 306 which is in communication with HEG controller 304. It is also assumed that the computer 306 is running an application that enables it to access and utilize energy management features and functions associated with HEG 304. In one illustrative embodiment, the energy management application that is executed by the computer is referred to as a Nucleus™ application (a trademark of General Electric Corporation of Fairfield, Conn.). HEG 304 may also be referred to as a Nucleus™ or Nucleus™ Energy Manager.

The methodology begins at block 1102. In step 1104, the customer (consumer or user) opens the Nucleus™ application running on computer 306. In step 1106, the Nucleus™ application gets price/temperature settings (setpoints or offsets) which were stored in the memory of the thermostat 150. In step 1108, the customer reviews the price/temperature settings. If he/she is not satisfied with the settings (step 1110), the customer modifies the settings in step 1112. In step 1114, the Nucleus™ application sends the modified settings to the thermostat 150, and the methodology ends at block 1116. If the customer is satisfied with the settings in step 1110, then the methodology ends at block 1116.

Figure 12:
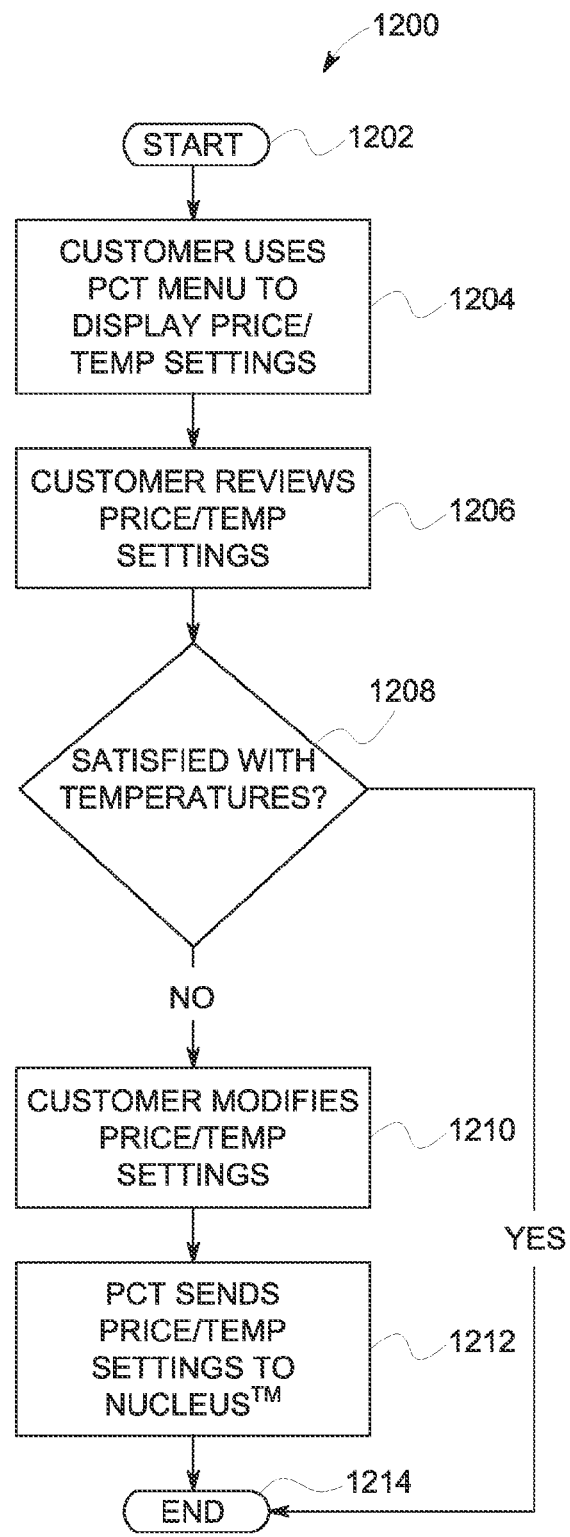
FIG. 12 is a diagram of a temperature control methodology, in accordance with another embodiment of the invention.

FIG. 12 is a diagram of a temperature control methodology 1200, in accordance with another embodiment of the invention. In this methodology, as compared to the one in FIG. 11, it is assumed that the customer uses the thermostat user interface 170 menu to access the price/temperature settings. Thus, the methodology begins at block 1202. The customer displays the settings in step 1204. In step 1206, the customer reviews the price/temperature settings. If he/she is not satisfied with the settings (step 1208), the customer modifies the settings in step 1210. In step 1212, the thermostat 150 sends the modified settings to the Nucleus™ application, and the methodology ends at block 1214. If the customer is satisfied with the settings in step 1208, then the methodology ends at block 1214.

Figure 13:
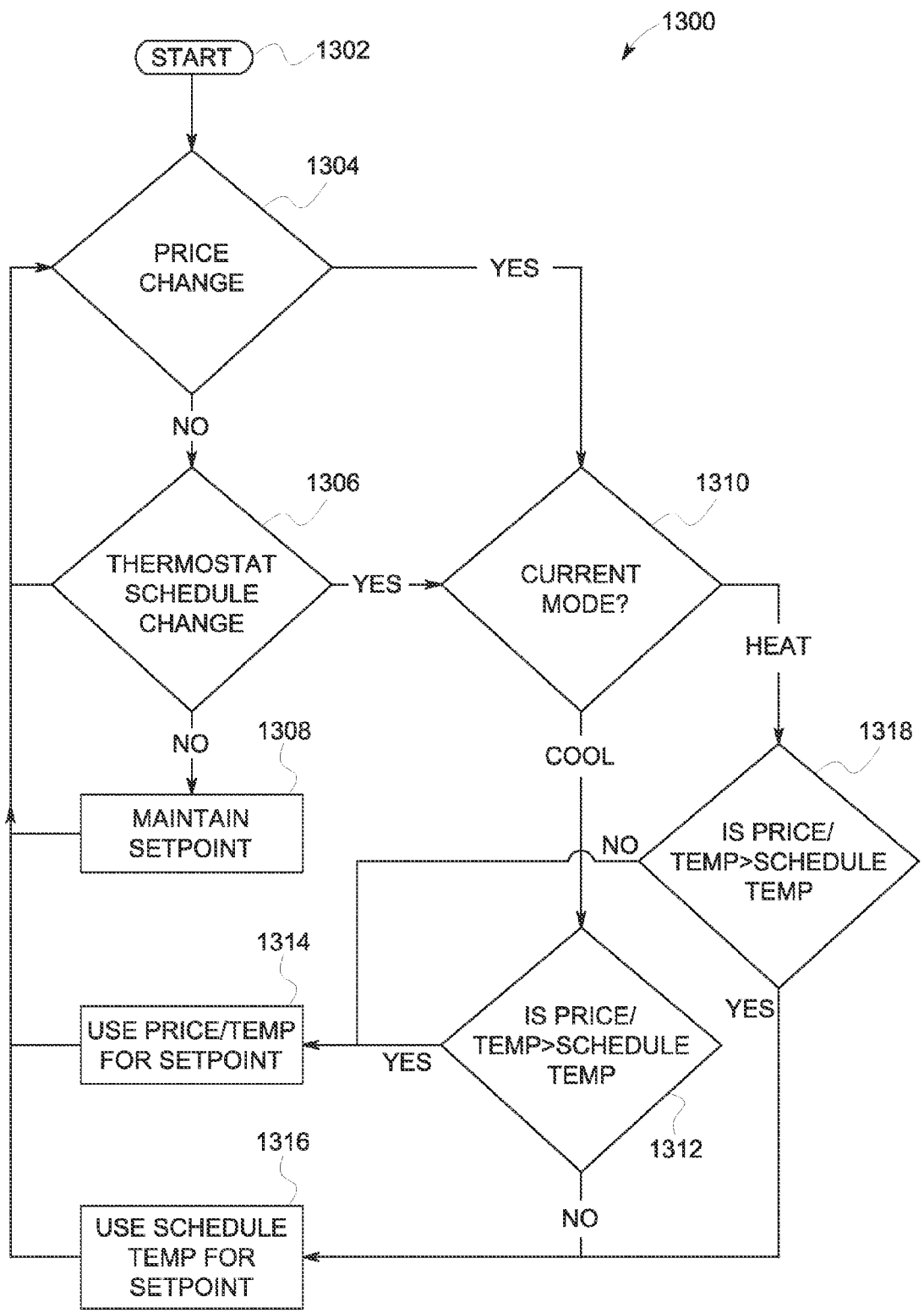
FIG. 13 is a diagram of a temperature control methodology, in accordance with yet another embodiment of the invention.

FIG. 13 is a diagram of a temperature control methodology 1300, in accordance with yet another embodiment of the invention. This methodology illustrates steps performed a controller in the HVAC system (e.g., controller 104, HEG 304, etc.) when there is a change to a setpoint temperature.

The methodology begins at block 1302. Step 1304 detects whether or not there has been a price change (this may be determined from information received via signal 108 (FIG. 1). If not, step 1306 determines whether or not there has been a thermostat schedule change (i.e., if at this time, the schedule is supposed to change setpoints, for example, 8:00 in FIG. 11). If no, then step 1308 directs the system to maintain the current setpoint(s). However, if in step 1304 a price change has been detected, or in step 1306 a temperature schedule change has been detected, then a determination is made in step 1310 as to what mode the system is in, i.e., heating mode or cooling mode.

If in cooling mode, step 1312 determines whether the price temperature value (setpoint or offset) results in a temperature that is greater than a schedule temperature (e.g., Energy Star recommended temperature). If yes, then the price temperature value is used as the setpoint (rather than Energy Star recommended temperature) in step 1314, else the schedule temperature is used in step 1316. Returning to the decision step 1310, if the system is in the heating mode, step 1318 determines whether the price temperature value (setpoint or offset) results in a temperature that is greater than a schedule temperature (e.g., Energy Star recommended temperature). If no, then the price temperature value is used as the setpoint (rather than Energy Star recommended temperature) in step 1314, else the schedule temperature is used in step 1316. The methodology then iterates for any subsequent price or thermostat schedule changes.

Thus, while there have been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system comprising:
   memory configured to store a temperature value based on a cost of a given energy resource, wherein the cost-based temperature value differs from a temperature value based on a temperature schedule;
   a controller operatively coupled to the memory and configured to compare the cost-based temperature value to the schedule-based temperature value, and to direct one of a cooling system and a heating system to maintain a temperature of an environment at the one of the cost-based temperature value and the schedule-based temperature value that results in an energy cost savings; and
   a user interface comprising
      one or more input features for selecting the cost-based temperature value; and
      one or more input features for opting out of the energy cost savings comparison.

2. The system of claim 1, wherein the memory and the controller are part of a thermostat device.

3. The system of claim 1, wherein the controller is further configured to receive cost information from an energy provider for determining the cost of the given energy resource.

4. The system of claim 1, wherein the user interface further comprises a manual entry cost schedule for determining the cost of the given energy resource.

5. The system of claim 1, wherein the user interface further comprises one or more output features for presenting energy management information.

6. The system of claim 1, wherein the temperature schedule comprises an Energy Star recommended temperature schedule.

7. The system of claim 1, wherein the cost of the given energy resource is specified in terms of a plurality of a cost tiers.

8. The system of claim 1, wherein the given energy resource comprises one of electricity, gas, and oil.

9. The system of claim 1, wherein the cooling system and the heating system are part of a heating, ventilation, and air conditioning (HVAC) system.

10. A system comprising:
    at least one of a cooling system and a heating system for respectively cooling and heating a given environment; and an energy management system coupled to the at least one of the cooling system and the heating system, the energy management system comprising:
  memory configured to store a temperature value based on a cost of a given energy resource, wherein the cost-based temperature value differs from a temperature value based on a temperature schedule;
  a controller operatively coupled to the memory and configured to compare the cost-based temperature value to the schedule-based temperature value, and to direct one of the cooling system and the heating system to maintain a temperature of the given environment at the one of the cost-based temperature value and the schedule-based temperature value that results in an energy cost savings; and
  a user interface comprising
    one or more input features for selecting the cost-based temperature value; and
    one or more input features for opting out of the energy cost savings comparison.

11. The system of claim 10, wherein the memory and the controller are part of a thermostat device.

12. The system of claim 10, wherein the controller is further configured to receive cost information from an energy provider for determining the cost of the given energy resource.

13. The system of claim 10, wherein the user interface further comprises a manual entry cost schedule for determining the cost of the given energy resource.

14. The system of claim 10, wherein the user interface further comprises one or more output features for presenting energy management information.

15. The system of claim 10, wherein the cost of the given energy resource is specified in terms of a plurality of a cost tiers.

16. The system of claim 10, wherein the given energy resource comprises one of electricity, gas, and oil.

17. A system comprising:
  memory configured to store a temperature value based on a cost of a given energy resource, wherein the cost-based temperature value differs from a temperature value based on a temperature schedule; and
  a controller operatively coupled to the memory and configured to compare the cost-based temperature value to the schedule-based temperature value, and to direct one of a cooling system and a heating system to maintain a temperature of an environment at the one of the cost-based temperature value and the schedule-based temperature value that results in an energy cost savings;
  wherein the temperature schedule comprises an Energy Star recommended temperature schedule.

* * * * *